United States Patent [19]

Johnson

[11] 3,993,140

[45] Nov. 23, 1976

[54] SUBSURFACE ROOT CROP HARVESTING BLADE ASSEMBLY

[75] Inventor: Lynn F. Johnson, American Falls, Idaho

[73] Assignee: Idaho Research Foundation, Inc., Moscow, Idaho

[22] Filed: May 27, 1975

[21] Appl. No.: 580,877

[52] U.S. Cl. .......... 171/17

[51] Int. Cl.[2] .......... A01D 17/00

[58] Field of Search .......... 171/71–107, 171/17

[56] References Cited

UNITED STATES PATENTS

| | | | |
|---|---|---|---|
| 533,288 | 1/1895 | Goodell | 171/76 |
| 602,497 | 4/1898 | Buck | 171/81 |
| 3,625,290 | 12/1971 | Johnson | 171/17 |

*Primary Examiner*—Russell R. Kinsey
*Attorney, Agent, or Firm*—Wells, St. John & Roberts

[57] ABSTRACT

An improved blade assembly for moving beneath the surface of the ground to engage and lift a subsurface root crop upwardly and rearwardly when moved along a forward path by a harvesting implement. The assembly includes an elongated blade that is held transverse to the forward direction of harvester travel. The blade is mounted to a framework for oscillational movement about a first horizontal axis and a second axis perpendicular to the horizontal axis. A power source operates the blade to oscillate about these axes in continuous cycles. Each cycle of blade movement includes a forward and downward stroke and an upward and rearward stroke. This movement occurs rearward of and below the horizontal pivot axis for the blade.

7 Claims, 4 Drawing Figures

37
11
4
2
37
18
18
21
15
15
13
11
12
13
19
19
22
22
16
23
29
10
28
4
29
14
28
2

18
37
39
38
32
10
32
3
17
11
34
15
3
19
29
32
12
13
22
14
16

SUBSURFACE ROOT CROP HARVESTING BLADE ASSEMBLY

BACKGROUND OF THE INVENTION

This invention relates to root crop harvesting equipment and more particularly to the blade assemblies that are utilized with such equipment for disengaging and lifting the root crop upwardly from their subsoil elevations.

Although harvesting of potatoes or other root crops has been considerably automated, it has been difficult to provide a harvester mechanism that is capable of delicately handling the crop without inflicting damage thereto. Studies have shown that in some parts of the United States approximately 10 percent of potato tubers are rejected as Number One Grade because of damage caused by harvesting equipment. This represents an annual loss in millions of dollars. Much of the harvesting injury is caused as the potatoes or other root crop is being disengaged from its subsoil environment.

In my previous application, now U.S. Pat. No. 3,625,290, I disclosed and claimed a new and useful separating apparatus for mobile potato harvesting vehicles that has proved to be very effective in reducing the amount of harvester damage to the harvested root crop. In the disclosure, I describe a vibrating digging means that is suspended on the supporting harvester framework for digging into the soil to lift both root crop and foreign material above the ground level onto a conveying mechanism. The vibration is produced about a horizontal axis spaced substantially rearward from the ground engaging blade. Primarily, the purpose of the vibrating motion was to produce rearward movement of the root crop onto the conveyor assembly. The present invention was designed as a substantial improvement over the vibrating digging means as set out in my prior patent. Through the present invention, not only is the root crop moved upward and rearwardly by the oscillating blade assembly, but the blade assembly is moved in such a manner as to loosen the soil forward of the blade assembly and therefore prevent undesired engagement and damage to the root crop forward of the leading blade edge as the implement is moved along.

The blade disclosed herein is unobstructed the full width of the machine, illustrated in a full two row width. The blades previously developed by me used a separate blade for each row and required pivot arms in the center of the machine, which was located along the furrow between two dug rows. The center arms presented an additional obstruction on which vines and trash could collect. It also made it impossible to dig windrowed potatoes, which are typically dug along two adjacent rows and placed in the furrow between them.

SUMMARY OF THE INVENTION

An improved subsurface harvesting blade assembly is described for engaging, loosening, and directing a subsurface root crop up and rearwardly from below the ground surface while being moved in a forward path along the ground. The blade assembly includes a framework that is adapted for mounting to a root crop harvesting implement. A spaced pair of upright pivot arms are pivotably mounted to the framework and spaced apart thereon transversely in relation to the forward path. The pivot arms depend from the framework for pivotal movement about a first horizontal axis. An earth engaging blade means extends transversely between the lower ends of the pivot arms and is mounted to the framework between the pivot arms for pivotal movement about a second axis that is substantially perpendicular to the first horizontal axis. Resilient bushing means is provided for mounting the pivot arms and earth engaging blade means to the framework. A drive means interconnects the pivot arms and framework to impart an oscillational movement to the blade means about both the first and second axes.

It is a first object of the present invention to provide a subsurface harvesting blade assembly that will assist in separation and progressive upward and rearward feeding of a root crop during harvesting.

It is a further object to provide such a blade assembly that is powered to oscillate about both a horizontal and a substantially vertical axis to further assist in loosening the soil in the vicinity of the blade means and thereby reduce damage to the root crop being harvested.

It is a further object to provide such a blade assembly that is simpler to manufacture, easier to maintain, lighter, and more reliable than previous blades.

These and yet further objects and advantages will become apparent upon reading the following detailed description, which, taken with the accompanying drawings, disclose a preferred form of the present invention.

DETAILED DESCRIPTION OF A PREFERRED EMBODIMENT

Figure 1:
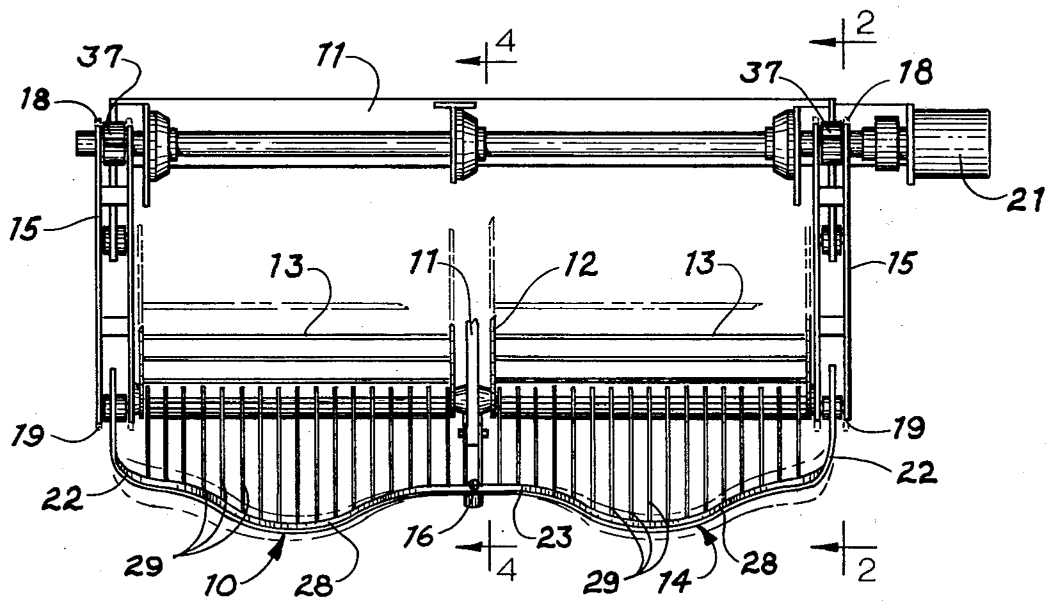
FIG. 1 is a front elevational view of the present apparatus.

A preferred form of the present invention is illustrated in the accompanying drawing and is designated generally therein by the reference numeral 10. The blade assembly 10 as shown is supported by a framework 11 that is adapted for mounting to a harvesting implement, a portion of which is indicated at 12. Such a harvesting implement may include features similar to those disclosed in my prior U.S. Pat. No. 3,625,290 granted on Dec. 7, 1971. The portion of the harvester shown is a primary pickup conveyor 13 that is utilized adjacent the digging section of a harvesting implement to receive the root crop harvested thereby.

Figure 3:
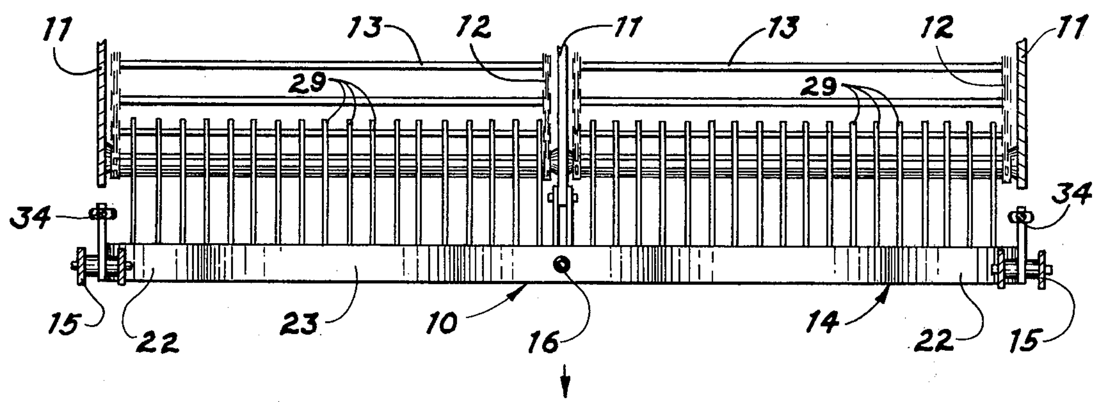
FIG. 3 is a reduced section view taken along line 3—3 in FIG. 2.

Looking now in particular detail at the present invention, reference will first be made to FIGS. 1 and 3. As shown, the assembly 10 includes a blade means 14 that is suspended by transversely spaced pivot arms 15 from framework 11. Blade means 14 is oriented transverse to an intended forward path of the device as indicated in FIG. 3 by the directional indicating arrow therein. Blade means 14 is pivotably mounted to framework 11 through pivot arms 15 and a center pivot 16. Center pivot 16 is located transversely at the center point of the blade means 14 and is supported by framework 11 from beneath.

The pivot arms 15 are upright and pivotably mounted by pins or bolts 17 to the framework 11. Pivot arms 15 each include an upper end 18 and a lower end 19 on opposite sides of pivot pins 17. A drive means 21 is connected at the upper ends of pivot arms 15 with lower ends 19 pivotably connected to blade ends 22 of blade means 14.

Figure 4:
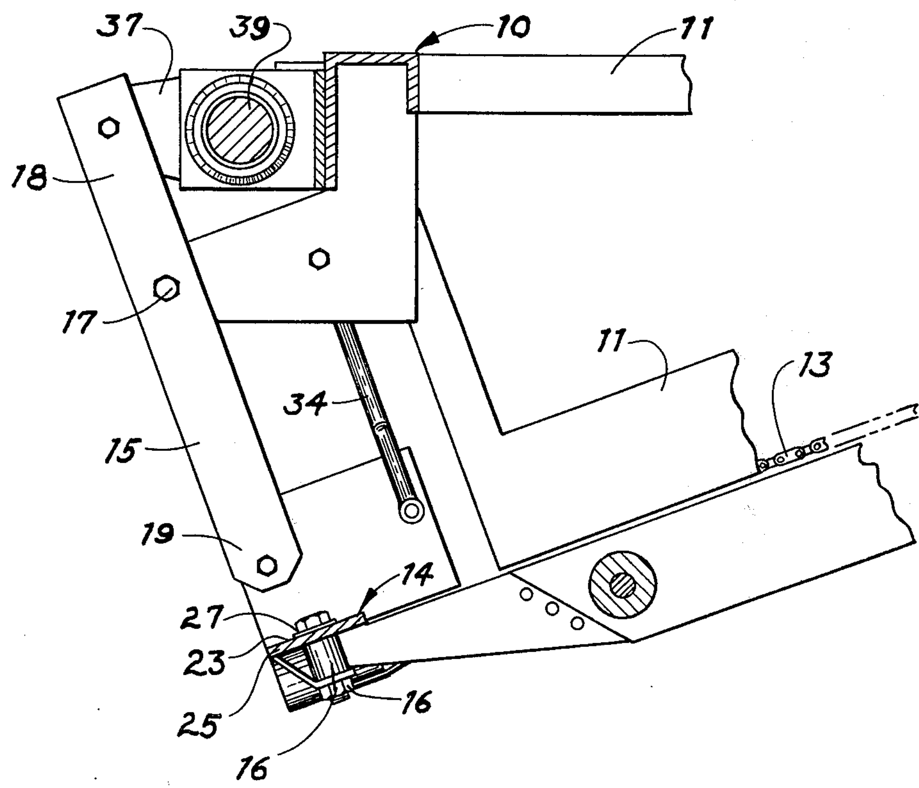
FIG. 4 is a section view taken along line 4—4 in FIG. 1.

As may be seen by FIG. 4, the blade means 14 is comprised of a horizontal bar 23 having a leading earth engaging edge 25 and an upwardly facing planar surface 27 extending rearwardly and upwardly therefrom. The bar 14 is bent along its length to form symmetrical arcuate portions 28 on either side of the axis at pivot 16. The arcuate portions 28 dip downwardly from blade ends 22 then upwardly toward center pivot 16. This configuration enables movement of the harvesting implement along adjacent rows of root crop to facilitate harvesting thereof simultaneously. A plurality of tines 29 extend rearward and upwardly from horizontal bar 23 to primary conveyor 13. The root crop is engaged by and lifted upward and rearwardly along surface 27 and tines 29 and directed thereby toward primary conveyor 13.

A pair of connecting arms 34 are mounted between framework 11 and blade ends 22. The connecting arms 34 are pivotably mounted at their ends to the framework and respective blade ends 22 so their centers are aligned along a line that is parallel to the pivot arms 15. Through this provision, the planar surface 27 will maintain its angular orientation relative to a horizontal plane throughout oscillational movement of the blade means 14 about the pivot 17.

It should be noted at this point that each one of the pivotable connections is provided with a resilient bushing 32 as means for enabling a certain amount of play between the interfitting elements. Bushings 32 are required since blade means 14 is operable to move about both a first horizontal axis (defined at pivot points 17) and a second axis (at the center pivot 16) that is perpendicular to the first axis. Therefore, it may be seen that the blade means 14 moves in substantially two perpendicular planes and about two axes.

Figure 2:
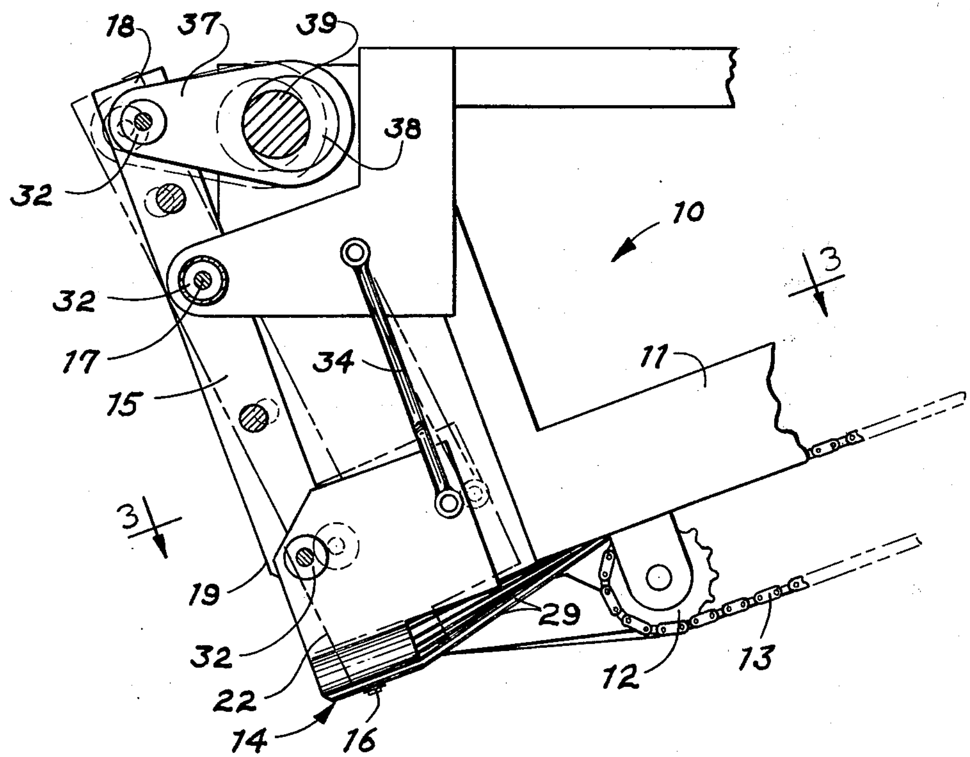
FIG. 2 is a sectional view taken along line 2—2 in FIG. 1.

As shown in FIGS. 1 and 2, drive means 21 is basically comprised of a pair of crank arms 37 interconnecting the upper pivot arms ends 18 to framework 11. An eccentric cam 38 is journalled within each crank 37 and is driven by a transverse shaft 39 from a hydraulic motor 30. The cams 38 are diametrically offset relative to the axis of shaft 39 to impart opposite movements to the blade means 14 on opposite sides of pivot 16. As shaft 39 rotates, the eccentric cams 38 operate to move the cranks 37 back and forwardly in an oscillational path. This movement is transmitted about pivots 17 through pivot arms 15 to the blade means 14. The resulting blade movement is a "rocking" oscillational movement about the axis of center pivot 16. This movement is shown by dashed lines particularly in FIG. 3, and also in FIGS. 1 and 2. A vertical component is added to this movement since blade ends 22 are pivoting about the first horizontal axis defined by pins 17. As shown in FIGS. 2 and 3, blade end 22 on one side moves frontwardly and downwardly in one stroke and rearwardly and upwardly in the return stroke, the opposite blade end on the other side of pivot 16 moves directly oppositely. It is this motion on opposite sides of center pivot 16 that enables blade means 14 to move rather effortlessly through the ground while loosening the surrounding soil to enable relatively free upward and rearward movement of the engaged root crop along blade surface 27 and tines 29.

It is preferred that drive means 21 and the length of arms 15 (relative to pivots 17) be designed so the total stroke of the blade means at blade ends 22 is approximately one inch. It is further preferred that the planar surface 27 of blade means 14 be inclined at an angle of approximately 20 degrees to the horizontal.

It is also important to note that the leading earth engaging edge 25 of the blade means 14 is located rearwardly from the axis of pivot 17. Through this provision, the oscillational movement of blade means 22 is disposed in a forward and downward direction in the forward stroke of the blade and upward and rearward with the backward stroke of the blade. The forward blade stroke performs the digging operation, while the backward and upward stroke assists in moving the harvested crop up and rearwardly toward the primary conveyor 13.

The above description and attached drawings have been given by way of example to set out a preferred form of the present invention, the scope of which is defined in the following claims:

What I claim is:

1. An improved subsurface harvesting blade assembly for engaging, loosening and directing a subsurface root crop up and rearwardly from below the ground surface while being moved in a forward path along the ground, comprising:

a framework adapted to be mounted to a root crop harvesting implement;

a pair of upright pivot arms spaced transversely in relation to said path and mounted to the framework and depending therefrom for pivotal movement about a first horizontal axis;

earth engaging blade means pivotably mounted to lower ends of the pivot arms and extending transverse to said path between said pivot arms and connected to said framework between said pivot arms for pivotal movement about a second axis substantially perpendicular to said first horizontal axis;

a pair of connecting arms spaced apart transversely in relation to said path and pivotably mounted to the framework and to said blade means for pivotal movement thereon and wherein the pivot axes of the connecting arms are parallel to said first axis and spaced longitudinally along said path from said first axis;

resilient bushing means for mounting the pivot arms and earth engaging blade means to the framework;

drive means interconnecting the pivot arms and framework for imparting an oscillational movement to said blade means about both the first and second axes.

2. The blade assembly as recited by claim 1 wherein said blade means includes a forward ground engaging edge with a planar surface leading rearwardly therefrom and wherein said forward edge is located below and rearward of said first horizontal axis.

3. The blade assembly as recited by claim 2 wherein:

said second axis is perpendicular to said planar surface and said planar surface is inclined downwardly toward said ground engaging edge; and elongated tines extending rearward and upwardly from said planar surface for guiding the harvested root crop from the ground surface when in operation.

4. The blade assembly as set out in claim 1 wherein said second axis is located at the transverse center of said blade means and said blade means is contoured on either side of said second axis in a downwardly arcuate configuration.

5. The blade assembly as set out by claim 2 wherein said drive means includes:

eccentric crank means interconnecting upper ends of said pivot arms and said framework;

a power source connected to said crank means for oscillating said blade means at said lower ends of said pivot arms in a prescribed continuous cycle rearward of said first horizontal axis;

wherein each cycle includes a forward and downward stroke and an upward and rearward stroke of said blade means.

6. The blade assembly as set out by claim 5 wherein said forward and downward stroke and said upward and rearward strokes are equal and approximately one inch in length.

7. The blade assembly as set out by claim 6 wherein said planar surface is inclined downwardly toward said ground engaging edge at approximately a 20° angle to the horizontal.

* * * * *